Oct. 14, 1958        G. STUBBS        2,855,932
ARTIFICIAL INSEMINATION AND CERVICAL MEDICATION MEANS
Filed March 1, 1955        2 Sheets-Sheet 1
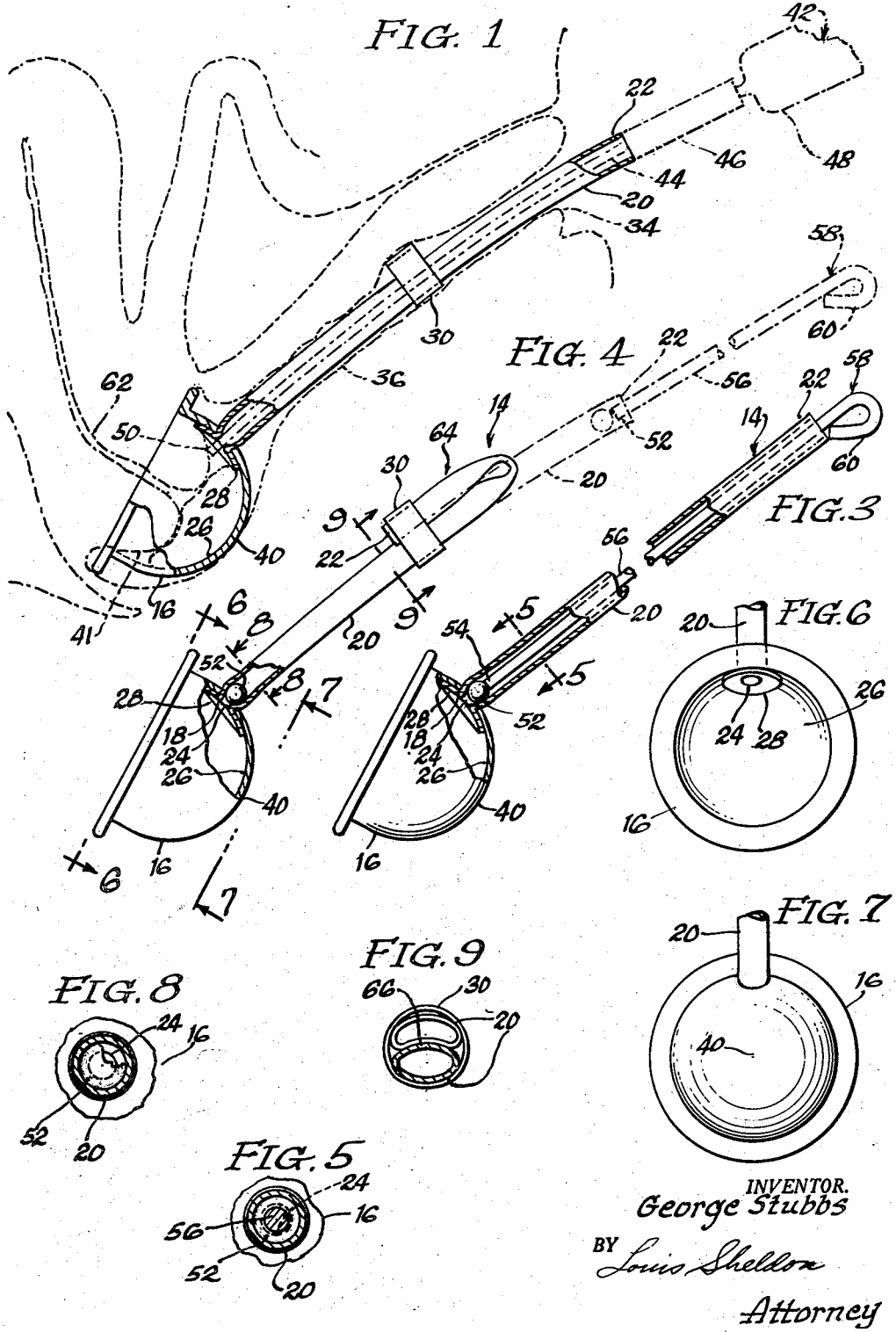
INVENTOR.
George Stubbs
BY Louis Sheldon
Attorney

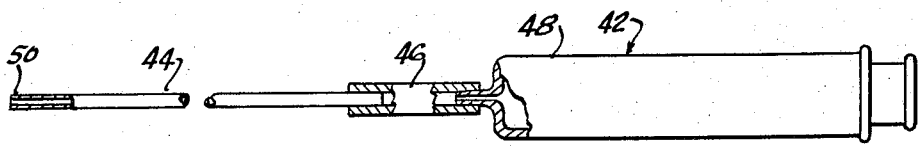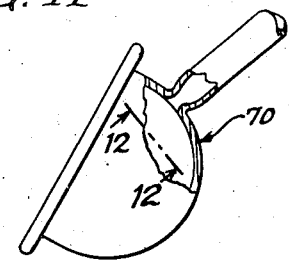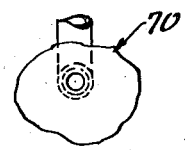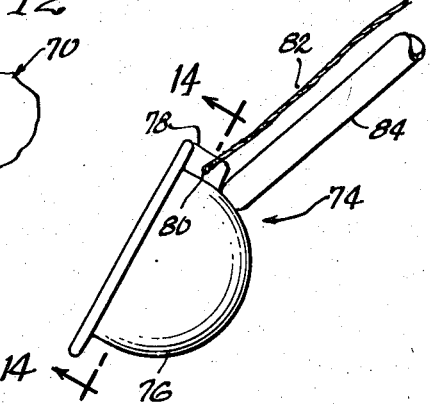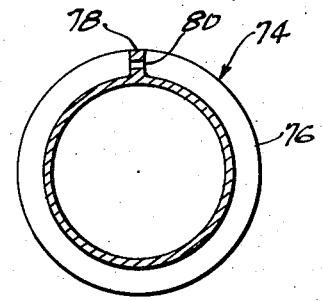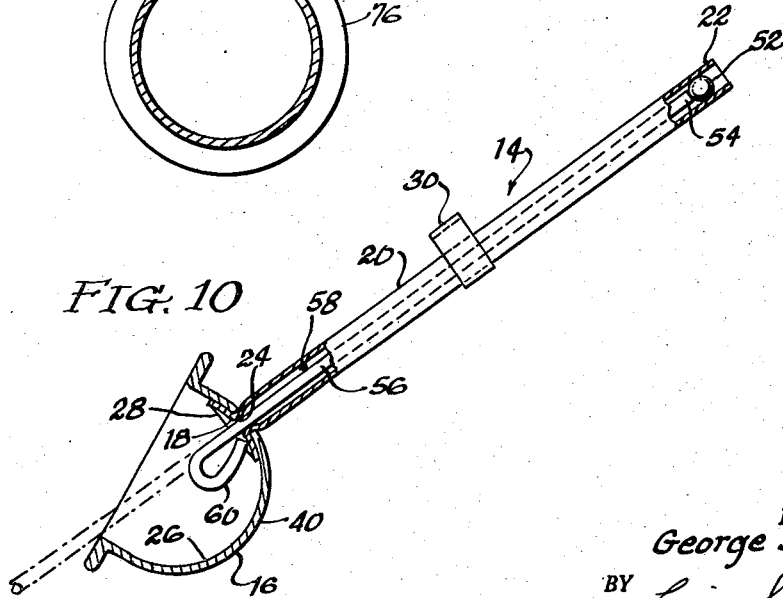

United States Patent Office 2,855,932
Patented Oct. 14, 1958

2,855,932

ARTIFICIAL INSEMINATION AND CERVICAL MEDICATION MEANS

George Stubbs, Los Angeles, Calif.

Application March 1, 1955, Serial No. 491,257

9 Claims. (Cl. 128—260)

This invention relates to artificial insemination and cervical medication, and is concerned more particularly with improved means for and methods of preparing therefor.

It is an object of the invention to facilitate the work of the physician in placing a medication or semen at the cervix of a patient.

It is also an object to provide means whereby the likelihood of spilling or other escape of semen or medication from a cervical cup or the like before or during placement and while in use is substantially minimized or precluded.

Further objects and advantages of the invention will appear as the description proceeds.

The invention will be better understood upon reference to the following description and the accompanying drawings, in which:

Fig. 1 is a side view, partly in section and partly in elevation, of a device embodying features of the invention, showing how the cup while about the cervix is supplied with semen or medication.

Fig. 2 is a view, partly in section and partly in elevation, of the injecting device shown in dot-dash lines in Fig. 1.

Fig. 3 is similar to Fig. 1 but shows how the cup is plugged after the sperm or medication is introduced into the cup.

Fig. 4 is similar to Fig. 1 but shows the cup assembly in operative position.

Fig. 5 is an enlarged sectional view taken as indicated by the line 5—5 in Fig. 3.

Figs. 6 and 7 are fragmentary elevational views, and Figs. 8 and 9 are enlarged sectional views, taken as indicated by the lines 6—6, 7—7, 8—8, and 9—9, respectively, in Fig. 4.

Fig. 10 is similar to Fig. 3 but shows how the plug is moved to the free end of the duct after the cup assembly is removed from the patient.

Fig. 11 is similar to the left part of Fig. 1 but shows a modification.

Fig. 12 is a fragmentary elevational view taken as indicated by the line 12—12 in Fig. 11.

Fig. 13 is a fragmentary elevational view of another modification.

Fig. 14 is a sectional view taken as indicated by the line 14—14 in Fig. 13.

Referring to the drawings, disclosing illustrative embodiments of the invention, and more particularly to Figs. 1 to 10, there is shown at 14 a device comprising a cervical cap or cup 16 having a hole 18, and a resiliently flexible thermoplastic hollow stem or duct 20 having an outside diameter normally greater than the diameter of the hole. The duct 20 may be attached to the cup 16 by squeezing an end 22 of the duct and passing it, like threading a needle, through the hole 18 from the inside of the cup, pulling the duct until only a small part of the other end portion of the duct is in the cup, the duct part 24 within the hole being constricted, heating the adjacent part of the end portion within the cup until it is soft enough to be shaped, and pressing the heated part against the inner surface 26 of the cup so as to flare it into the form of a flange 28 substantially in surface engagement with the cup, the flange shape being retained upon cooling. If desired, the flange could be formed independently of the cup. A flexible or other loop 30 is secured, as by cement, to an intermediate part of the duct 20 for a purpose which will appear.

For a patient whose cervix is directed more or less toward the mouth or anterior end 34 of the vaginal canal, the cup will fit the cervix with the cup bottom 40 more or less facing the mouth of the canal, so that, if the duct 20 is attached at the cup bottom, the duct will not be folded from the place of attachment in order to extend along the canal toward the mouth thereof, and accordingly such a construction would be satisfactory. However, if the patient's cervix directly faces the bottom of the wall of the vaginal canal, as shown at 41 in Fig. 1, and the duct is secured directly to the bottom 40 of the cup, the device would be inoperative since it would be necessary to fold the duct adjacent its place of securement to the cup and thus close or substantially close the duct so that no or substantially no semen or medication could be injected into the cup through the duct.

In order to provide a device which is suitable for use with the cervix regardless of the position of the cervix relative to the vaginal canal, I have secured the duct 20 to the cup 16 in offset relation to the cup bottom 40. With this construction, the cup can be positioned with the attached end of the duct at the front side of the cup as seen from the mouth of the vaginal canal, regardless which of the above-noted positions the cervix occupies relative to the vaginal canal, and accordingly the duct will extend, without folding, outward along the canal. The resilience of the duct 20 permits of its being easily flexed to a substantial extent, without folding, adjacent its throat 24, and throughout its length, to assume readily a position and shape to which it is confined by the walls of the vaginal canal.

In one method of making use of the cup assembly, the physician, using forceps, or digitally, positions the cup 16 as noted above, the duct 20 preferably being of a length such that its outer end 22 projects slightly out of the vaginal canal; then he takes a hypodermic type syringe 42 in which the usual needle is replaced by a plastic or other suitable soft flexible tube 44 connected by an adapter or nipple 46 to the syringe cylinder 48, collects a suitable quantity of the husband's sperm or the medication, as the case may be, supplied to the physician in a sac or other container, inserts the tube in the outer end of the duct and along the duct until stopped by engagement of the adapter with the duct end (Fig. 1), the tube end 50 then being adjacent the cup, and injects the liquid into the cup, the tube being sufficiently small in outside diameter to afford clearance between it and the duct throat 24 for the escape of air displaced by the injected liquid; the physician then takes a plug such as the ball 52, of plastic or other suitable material, and of the same diameter as the inside of the duct 20, or slightly larger, wets it with a suitable lubricant such as glycerine or the injected liquid, and inserts it into the outer end of the duct; then he places the free end 54 of the stem 56 of a ramrod 58 against the outer side of the ball and pushes the ball until stopped by engagement of the ramrod handle 60 with the outer end of the duct, the ball then being disposed adjacent the duct throat 24, where it prevents leakage of the injected substance from the cup so that substantially all of the contents of the cup may be aspirated into the cervical canal 62, and the ramrod is then withdrawn; then he folds the outer end portion of the duct upon itself as noted at 64 (Fig. 4), with the outer end of the duct inserted between and removably held against accidental escape by the loop 30 and the adjacent part 66 of the duct. The fold insures against leakage of any liquid which, due to manufacturing tolerances, may have passed outward beyond the ball 52.

When the device 14 has served its purpose, the physician or patient digitally moves the cup 16 to break the suction, pulling on the folded part of the duct 20, removes the device bodily from the patient. Then, with the use of the ramrod 58, the ball 52 is pushed outward (Fig. 10) until the handle 60 engages the inner surface 26 of the cup 16, with the ball adjacent the duct end 22, the ramrod is removed, and the duct is squeezed to eject the ball. Now the cup, duct, and ball are sterilized for the next use thereof.

In accordance with another method of charging the cup the physician first fits the wetted ball 52 into the duct end 22, and, using a syringe of the type above described, or a hypodermic syringe, injects the sperm or medication into the duct at the cup end thereof. The device can then be handled and manipulated without danger of spilling. Then he positions the cup 16 about the cervix, and proceeds with the ramming of the ball 52, which acts like a piston to force the liquid from the duct into the cup, and then he folds the duct as noted above.

The cup 16 may be formed of polyethylene and the duct and loop may be formed of polyethylene or polyvinylchloride, and the ramrod of Lucite, or other suitable materials for the several parts may be employed. The ramrod may be rigid but is preferably resiliently flexible yet sufficiently stiff to enable it to pass substantially fully into the part of the duct confined in the vaginal canal.

Instead of making the cup and duct of separate parts attached together, they could be molded or otherwise formed as one piece as shown at 70 (Figs. 11 and 12).

A further modified structure is shown at 74 (Figs. 13 and 14), wherein the cup 76 is formed with a lug 78 having a hole 80 for anchoring a piece of string 82 adapted to extend alongside the duct 84 in the vaginal canal and of such length that its free end extends somewhat outside of the canal so that it may be conveniently pulled to break the suction in the cup preparatory to removal of the unit.

Various modifications may suggest themselves to those skilled in the art without departing from the spirit of the broader aspects of my invention.

I claim:

1. A device for use in artificial insemination, said device comprising a cervical cup of a size to fit over the human cervix and to bring the cervix into contact with a pool of fluid in the cup, a duct connected at one end to and communicating with said cup adjacent the bottom of said cup, the other end of said duct being open and being extendable to the anterior end of the vaginal canal when said cup is about the cervix, whereby said other end of said duct is accessible to the physician for the injection of semen through said duct to the interior of said cup, and for enabling him to pull the device out of the patient when it has served its purpose, and a plug slidably disposed in said duct in proximity to said cup and making a sealing fit therewith to prevent leakage of the semen from the cup.

2. A device of the class described, comprising a cervical cup having a hole near the bottom thereof, said cup being of a size to fit over the human cervix and to bring the cervix into contact with a pool of fluid in the cup, a flexible duct pinched liquid tight in said hole and having an end flange engaging the inner surface of said cup about said hole, the other end of said duct being extendable to a point adjacent the mouth of the vaginal canal when said cup is in proper position about the cervix for enabling the physician to inject semen through said duct to the interior of said cup and to thereafter force a plug into said duct to a position adjacent said cup, the pinched portion of said duct serving as an abutment preventing the plug from entering said cup.

3. A device of the class described, comprising a cervical cup of a size to fit over the human cervix and to bring the cervix into contact with a pool of fluid in the cup, a flexible duct anchored at one end to and communicating with said cup, said duct being extendable to a point adjacent the mouth of the vaginal canal for the convenient reception of the discharge tube of a syringe whereby semen may be deposited in said cup from the syringe while said cup is in position about the cervix, the inside diameter of said duct being sufficiently great to enable air displaced by the syringe tube and deposited semen to escape from the outer end of said duct, and a plug in said duct adjacent said cup which closes the duct to prevent leakage of fluid from the cup, said plug being adapted to be rammed into the outer end of and along said duct substantially as far as said cup while said cup is in said position, and to be frictionally retained by said duct, said duct being of reduced inside diameter adjacent said cup to prevent ramming of said plug into said cup, said plug being adapted to be rammed in the opposite direction out of said cup after the device is removed from the patient.

4. A device of the class described, comprising a dome shaped cervical cup of a size to fit over the human cervix and to bring the cervix into contact with a pool of fluid in the cup and having a hole therethrough adjacent the bottom thereof, a duct one end of which is pinched liquid tight in said hole, said duct being curved so as to diverge from the dome axis to substantially assume the path of the vagina outward from the cervix when said cup encloses the cervix, said duct being readily flexible at its juncture with said cup to enable said duct to assume its position in the vaginal canal without folding of said duct, the other end of said duct being adapted to project from the vaginal canal when said cup encloses the cervix, for facilitating the physician's injection of semen through said duct and into said cup and his removal of the device when it has served its purpose, and a plug in said duct adjacent said cup which closes the duct to prevent leakage of fluid from the cup, said plug being insertible in said other end and having a close fit with said duct and adapted to be rammed along said duct substantially as far as said cup to substantially prevent leakage from said cup, and means on said duct for releasably maintaining the duct in a folded condition within the vaginal canal.

5. A device of the class described, comprising a dome-shaped cervical cup of a size to fit over the human cervix and to bring the cervix into contact with a pool of fluid in the cup and having a hole therethrough offset from the bottom center of said cup, a resilient normally open duct hermetically united with said cup and communicating therewith at said hole and arranged to extend along the vaginal canal and to project outside fo the vaginal canal when said cup encloses the cervix, a loop secured to and circumscribing an intermediate part of said duct, the projecting part of said duct being foldable upon itself and the free end of said duct being insertible into said loop.

6. A device of the class described, comprising a dome-shaped cervical cup of a size to fit over the human cervix and to bring the cervix into contact with a pool of fluid in the cup and having a hole therethrough offset from the bottom center of said cup, a resilient normally open duct hermetically united with said cup and communicating therewith at said hole and arranged to extend along the vaginal canal and to project outside of the vaginal canal when said cup encloses the cervix and means closing off said duct adjacent said cup when the cup is around the cervix, said means being movable to a position where the duct is open.

7. Means of the character described, comprising a cervical cup of a size to fit over the human cervix and to bring the cervix into contact with a pool of fluid in the cup, a duct secured at one end to and communicating with said cup and adapted to extend outward along the vaginal canal to a point near but outside of the vaginal canal when said cup is in position about the cervix, whereby a quantity of liquid to be aspirated into the cervical canal may be injected by syringe from the outside into said duct and deposited in said cup, a plug in said duct adapted to be inserted into the outer end of said duct with a sliding friction fit throughout its periphery, a ramrod comprising a stem engageable at one end with the inserted plug and adapted to ram the plug along said duct toward said cup, said ramrod including at the other end of said stem a handle projecting laterally to such an extent as to be incapable of entering said duct, the length of said stem being equal to the length of said duct less the length of said plug so that, when said stem is in said duct and said handle is at said outer end of said duct, said plug is at the secured end of said duct to prevent leakage of liquid from said cup, said outer end of said duct serving as a means whereby said cup, duct, and plug as a unit may be pulled out of the vagina after said cup has served its purpose, said handle being of a size to pass freely into said cup whereby said ramrod may be employed to ram said plug back to said other end of said duct.

8. In combination, a cervical cup of a size to fit over the human cervix and to bring the cervix into contact with a pool of fluid in the cup, a ramrod for use with the cup, said cup having a communicating duct of such length that when the cup encloses the cervix the outer end of the duct is outside of and near the vagina, and a plug in the duct insertible in the outer end of the duct with a sliding friction fit throughout its periphery, said ramrod comprising a stem having a free end engageable with the inserted plug and freely enterable in the outer end of the duct to ram the plug along the duct, said ramrod including a handle at the other end of said stem, said stem being of such length that when said stem is in the duct and said handle is adjacent the outer end of the duct, the plug is at the inner end of the duct to prevent leakage of semen from the cup, said stem being freely enterable into the inner end of the duct, said handle being of a size rendering it incapable of entering said duct but freely passable into said cup as said stem is used to ram the plug outward to the outer end of the duct.

9. A device for use in artificial insemination or cervical medication, said device comprising a cervix-receiving cup of a size to fit over the human cervix and to bring the cervix into contact with a pool of fluid in the cup and comprising a single thin walled member adapted to be held in place by suction, a duct secured at one end to and communicating with said cup and being of a length to extend at least substantially to the mouth of the vagina when said cup is about the cervix, whereby semen or medication may be injected by syringe from the outside into said duct and deposited in said cup, and a string anchored to said cup at the outside thereof and adjacent the secured end of said duct and of a length to extend to the mouth of the vagina where it may be pulled to break the suction in the cup preparatory to pulling on said duct to withdraw said cup from the patient after said cup has served its purpose.

References Cited in the file of this patent

UNITED STATES PATENTS

| 300,770 | Farr | June 24, 1884 |
| 602,777 | Scroggs | Apr. 19, 1898 |
| 1,003,821 | Svejnar | Sept. 19, 1911 |

FOREIGN PATENTS

| 117,023 | Australia | May 24, 1943 |

OTHER REFERENCES

"Journal of the American Medical Association," May 31, 1952; vol. 149, No. 5, pp. 427, 428, 429.